(12) United States Patent
El-Amawy et al.

(10) Patent No.: US 7,315,517 B2
(45) Date of Patent: Jan. 1, 2008

(54) NON-BLOCKING WDM OPTICAL NETWORKS

(75) Inventors: Ahmed A. El-Amawy, Baton Rouge, LA (US); Stefan A. Pascu, Baton Rouge, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 953 days.

(21) Appl. No.: 10/441,480

(22) Filed: May 20, 2003

(65) Prior Publication Data

US 2003/0218989 A1    Nov. 27, 2003

Related U.S. Application Data

(60) Provisional application No. 60/382,382, filed on May 22, 2002.

(51) Int. Cl.
  *H04L 12/28* (2006.01)
(52) U.S. Cl. ............... 370/256; 370/389; 370/432; 398/55
(58) Field of Classification Search ............ 370/254, 370/255, 256, 407, 408, 389, 390, 395.31, 370/396, 397, 398, 399, 400, 432; 710/317
See application file for complete search history.

(56) References Cited

U.S. PATENT DOCUMENTS

| | | | |
|---|---|---|---|
| 5,134,690 A | * | 7/1992 | Samatham .................. 710/317 |
| 5,351,146 A | * | 9/1994 | Chan et al. ................... 398/58 |
| 5,598,570 A | * | 1/1997 | Ho et al. ....................... 712/12 |
| 6,385,206 B1 | * | 5/2002 | Nakata ........................ 370/407 |
| 6,456,588 B1 | | 9/2002 | Simmons .................... 370/216 |
| 6,714,552 B1 | * | 3/2004 | Cotter ......................... 370/406 |

OTHER PUBLICATIONS

Beauquier, B. et al., "Graph Problems Arising in Wavelength-Routing in All-Optical Networks," Proc. 2nd Workshop Optics & Comp. Sci., IPPS (1997).
Saengudomlert, P., "Architectural Study of High-Speed Networks with Optical Bypassing," PhD Thesis, pp. 17-23 and 63-67, Massachusetts Institute of Technology (Sep. 2002).
Zhou, C. et al., "Wide-Sense Nonblocking Multicast in a Class of Regular Optical WDM Networks," *IEEE Trans. Comm.*, vol. 50, pp. 126-134 (2002).

* cited by examiner

*Primary Examiner*—Ricky O Ngo
*Assistant Examiner*—Kan Yuen
(74) *Attorney, Agent, or Firm*—John H. Runnels; Bonnie J. Davis (57) ABSTRACT

A system is disclosed for implementing WDM optical networks, without blocking, and without the need for wavelength converters. The method is based on a hypercube topology for connecting the nodes, and a novel algorithm for constructing a routing tree such that blocking cannot occur even under the stringent requirement of all-to-all broadcasting. The algorithm uses shortest paths and a small number of wavelengths to satisfy the all-to-all connectivity requirement. The number of wavelengths used may, in fact, be the minimum number needed to satisfy the all-to-all connectivity requirement, using shortest paths.

13 Claims, 7 Drawing Sheets

NON-BLOCKING WDM OPTICAL NETWORKS

CROSS-REFERENCE TO RELATED APPLICATION

The benefit of the May 22, 2002 filing date of provisional application Ser. No. 60/382,382, the complete disclosure of which is hereby incorporated by reference, is claimed under 35 U.S.C. §119(e).

BACKGROUND OF THE INVENTION

This invention pertains to wavelength division multiplexing (WDM) optical networks, particularly to WDM networks whose design avoids blocking of communication paths among nodes.

Demand for network bandwidth has grown at very fast pace in recent years. This is mostly due to the very large increase in Internet traffic. It has been estimated that Internet traffic has been growing exponentially at an annual rate around 300%. The overall volume of data traffic overtook that of voice traffic for the first time around the year 2000. This increase has resulted in the deployment of optical networks to meet the ever-expanding demand. Due to recent advances such as Wavelength Division Multiplexing (WDM) and Dense Wavelength Division Multiplexing (DWDM), optical networks have been able, so far, to provide the bandwidth needed to meet demand. Optical long-haul networks (which were originally deployed in the 1980s for carrying long distance voice traffic), have evolved over the years. Optical networks have become ubiquitous not only at the long-haul level but also at the Metropolitan Area Network level.

The ability to supply continually increasing bandwidth will be enhanced if optical-electronic-optical conversions can be avoided at intermediate nodes. Recent years have witnessed much activity in optical components such as optical cross connects, optical wavelength routing switches, optical add/drop multiplexers, optical amplifiers, etc. Ideally, one would prefer an all-optical network, one in which all connections between source and destination nodes are optical, with no need for optical-electronic-optical conversions.

A wavelength division multiplexing (WDM) network is one in which multiple wavelengths of light are used simultaneously to transmit information on a single path or fiber. A major issue in WDM all-optical networks is that of establishing efficient lightpaths. In existing WDM networks, a call that arrives at a particular node, say $N_x$, on a given wavelength, say $\lambda_i$, can either be forwarded to the next node, say $N_y$ on $\lambda_i$ (if $\lambda_i$ is free on the $N_x \rightarrow N_y$ link), or it must be converted to another available wavelength before being re-transmitted, if possible. If neither is possible, then the call is said to be "blocked." Such blockage can be due to several factors: the unavailability of a $\lambda_i$ on the $N_x \rightarrow N_y$ link, the unavailability of a wavelength converter at $N_x$, or the unavailability of any free wavelength from $N_x$ to $N_y$. The blocked call in such a case is generally dropped, and the source generally then re-attempts the connection at a latter time. In time-critical applications, the resulting delay may not be acceptable.

If converters are not available in the network, a lightpath must use the same wavelength on each link in the route. Such a restriction is called the wavelength-continuity constraint. Under such a constraint, establishing a lightpath has two aspects: (1) determining the route from source to destination; and (2) assigning a particular wavelength to the lightpath. This is known as the routing and wavelength assignment (RWA) problem. Wavelength converters are expensive and introduce noise to a signal. For that reason it is highly desirable to minimize the number of converters used in a network, or to minimize the blocking probability given a certain number of converters.

To the knowledge of the inventors, before the priority date for the present application, no one had previously reported a non-trivial solution to the problem of designing non-blocking, lightpath-routed WDM (or DWDM) all-optical networks. In recent years much attention has been given to the development of new topologies and new routing schemes for optical networks, especially at the metropolitan area network level. There are two reasons for the recent intense interest in this area. First, networks with higher connectivity than the traditional "ring" topology can offer higher bandwidths and better scalabilities. Second, networks with higher connectivity can offer better fault resilience and more efficient provisioning. There are different approaches to the routing and wavelength assignment problem. One previous method assumes no wavelength converters are used, and assigns wavelengths on-line (in real-time) based on the availability of wavelengths at the source node. In this scheme, the lightpath is necessarily established under the wavelength continuity constraint—since no converters are available. However, if the wavelength selected at the source is not available along every link in the path, then the call is blocked and a connection will have to be re-attempted at a later time.

Wavelength converters can be used in establishing lightpaths to reduce the probability of blocking. In general, wavelength converters are expensive and are prone to introducing noise to a signal. Thus wavelength converters represent a less-than ideal solution. Wavelength converters are typically one of two types: full-range or partial-range wavelength converters. A full-range wavelength converter can convert a signal on wavelength $\lambda_i$ to any of the output wavelengths. A partial-range wavelength converter can only convert to a proper subset of the output wavelengths.

Routing may be fixed or adaptive. In fixed routing schemes the route is determined based solely on the identity of the source and destination nodes. In some fixed routing schemes, more than one path may be predetermined and stored in an ordered list at the source node's routing table. Adaptive schemes are more complex to implement. They take network conditions into account while making routing decisions.

U.S. Pat. No. 6,456,588 discloses a telecommunications network architecture having a plurality of n-dimensional hypercubes ($3 \leq n$), a plurality of nodes, and a plurality of links. Each hypercube is interconnected with at least-one other hypercube, and has $2^n$ vertex nodes. Each vertex node has a degree n, meaning that it is connected by links to n other vertex nodes. Features of the network were said to include decentralized node control, substantially independent traffic management within each hypercube, working and protection links with less traffic-bearing capacity, vertex node labeling that reduced inter-nodal communication, and less complex traffic routing and recovery algorithms. This disclosure addresses the problem of bypassing or recovering from faults on a network, but does not address the problem of blocking.

C. Zhou et al., "Wide-Sense Nonblocking Multicast in a Class of Regular Optical WDM Networks," *IEEE Trans. Comm.*, vol. 50, pp. 126-134 (2002) describes a study of multicast communications in a class of optical WDM networks with regular topologies such as linear arrays, rings, meshes, tori, and hypercubes. The authors derived what were said to be necessary and sufficient conditions on the minimum number of wavelengths required for a WDM network to be wide-sense nonblocking for multicast communication under some commonly used routing algorithms. The authors addressed a case in which the destinations of a multicast operation receive different (individualized) messages. The method required N/2 wavelengths to achieve non-blocking (where N is the number of nodes). The method did not address the issue of identical copies delivered to destinations of a multicast operation, or the case of all-to-all broadcasting. Also, the method addressed only the case of a single source, but not the case of multiple concurrent sources.

P. Saengudomlert, "Architectural Study of High-Speed Networks with Optical Bypassing," PhD Thesis, Massachusetts Institute of Technology (September 2002), at pages 17-23 and 63-67 addresses the RWA problem for all-to-all broadcast in an n-dimensional hypercube. The proposed non-blocking solution employs N/2 wavelengths per path or fiber, where N is the total number of nodes.

B. Beauquier et al., "Graph Problems Arising in Wavelength-Routing in All-Optical Networks," *Proc. 2nd Workshop Optics & Comp. Sci.*, IPPS (1997) discloses theoretical results obtained for wavelength routing in WDM all-optical networks. The authors concluded that in a hypercube any a priori-known permutation may be routed in a blocking-free manner using two wavelengths.

A trivial, but generally impractical, solution to the blocking-free routing problem is a network in which each node has a direct (or dedicated) connection to every other node. In such a fully-connected system a single wavelength would suffice, since no intermediate nodes would need to be involved in any communications. However, with N nodes the number of connections per node is (N−1). In a ring topology with N nodes, [N/2] wavelengths are needed to achieve non-blocking, all-to-all connectivity. The cases of 2-D mesh and 2-D torus are difficult to solve optimally; to the knowledge of the inventors, before the priority date claimed by the present application, it had not been reported for these topologies how many wavelengths would be needed, nor how to accomplish non-trivial, blocking-free routing.

BRIEF SUMMARY OF THE INVENTION

We have discovered a novel system for implementing wavelength-routed, WDM optical networks, without blocking, and without the need for wavelength converters.

The novel method is based on a hypercube topology for connecting the nodes, and a novel algorithm for constructing a routing tree such that blocking cannot occur even under the stringent requirement of all-to-all broadcasting. The algorithm uses shortest paths and a small number of wavelengths to satisfy the all-to-all connectivity requirement. (The number of wavelengths used is believed to be the minimum needed to satisfy this requirement, although this "minimal" hypothesis has not yet been proven.) It is also possible to "trade" the number of wavelengths used with the degree of connectivity required. For example, an augmented hypercube may be able to use fewer wavelengths for the same capabilities; while a hypercube with "missing edges" may need to use additional wavelengths in compensation. In addition, if the connectivity requirement is relaxed to require just the ability to implement any permutation in a non-blocking manner, then one can use fewer wavelengths. ("Permutation" in the sense used here is defined below.)

DETAILED DESCRIPTION OF THE INVENTION

Figure 1:
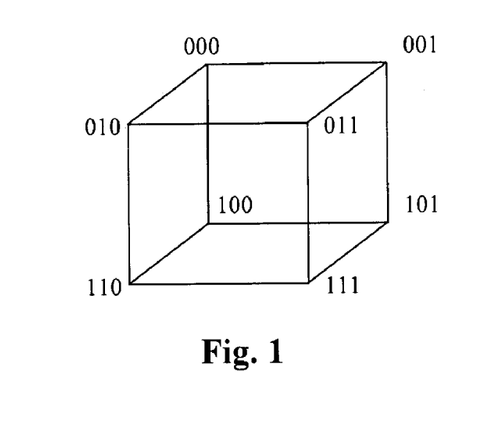
FIGS. 1, 2, and 3 depict hypercubes of dimensionalities 3, 4, and 5, respectively.
Figure 2:
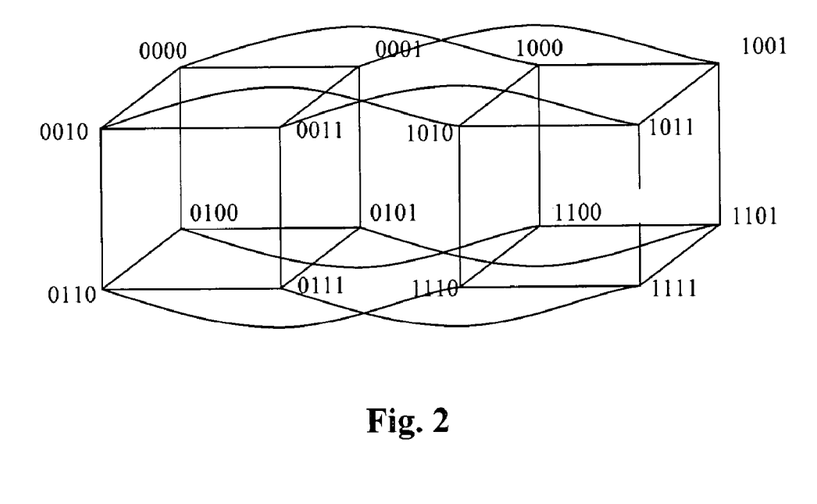
Figure 3:
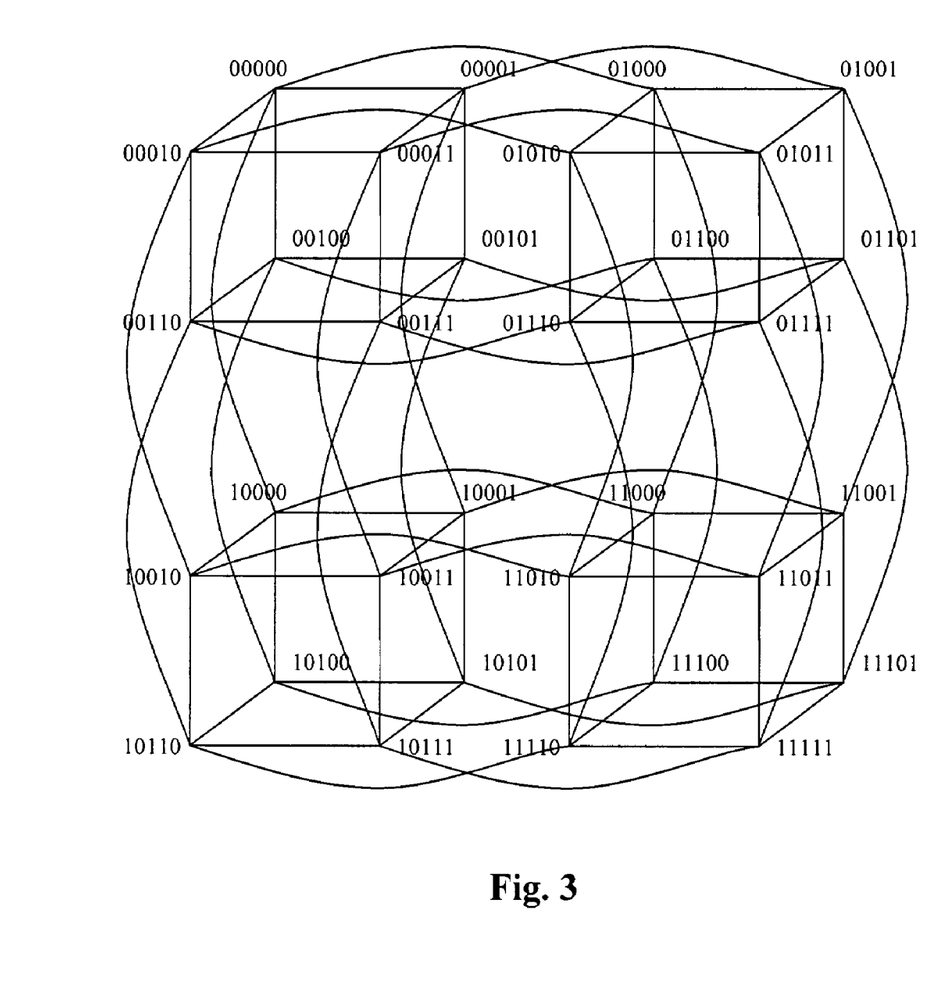

The Hypercube Topology. Our basic scheme employs a binary hypercube (or just "hypercube") topology, in which the number of nodes is $N=2^n$, and n is the dimensionality of the hypercube. (Variations on this basic scheme are also possible, and some such variations are described below.) FIGS. 1, 2, and 3 depict hypercubes of dimensionalities 3, 4, and 5, respectively. Each node is associated with an n-bit label. Note that in this labeling scheme two nodes of the hypercube are directly connected if, and only if, their labels differ in exactly one bit. We assume for the time being that each link comprises at least one optical connection (e.g., fiber optic cable) that can carry WDM signals. How to determine the number of wavelengths is discussed below. Furthermore, the number needed will vary depending on the desired capabilities. For example, a four-dimensional binary hypercube with 16 nodes requires 4 wavelengths per link to achieve non-blocking, all-to-all broadcast capability. On the other hand only three wavelengths per link are needed if we require only that the network be able to perform any permutation without blocking. These numbers (three and four wavelengths) are far smaller than what previous methods have employed, some of which prior methods may not even guarantee non-blocking.

For comparison, B. Beauquier et al., op cit., disclosed a method employing two wavelengths to perform any a priori determined permutation on a hypercube. C. Zhou et al., op cit., disclosed a method for a single multicast, of possibly different messages, using N/2 wavelengths for wide-sense non-blocking routing on a hypercube, where N is the total number of nodes. P. Saengudomlert, op cit., disclosed a method for addressing the RWA problem for all-to-all broadcasting in an n-dimensional hypercube; this solution used N/2 wavelengths per fiber, where N is the total number of nodes.

Most extant networks do not conform to a hypercube topology, as they were not designed with the present invention in mind. However, pre-existing networks may be augmented with additional links as necessary to conform to a hypercube topology. Alternatively, as discussed further below, a "virtual" hypercube topology may be embedded in an existing network topology; i.e., an existing network topology may be "retrofitted" without adding new links to simulated a hypercube topology. A "virtual connection" is made via other nodes between nodes that are not directly connected, but that "should" be connected in a hypercube topology, by way of one or more reserved wavelengths. Because the wavelengths are reserved (at least over the affected route), the established light paths will cut through intermediate nodes, thus emulating a direct connection with as many wavelengths. When new networks are designed, however, in many cases it will likely be most efficient to construct an actual hypercube topology to implement the non-blocking optical network. Further, a hypercube topology is preferable for a control plane implementation, as described further below. A significant advantage of a hypercube topology over almost any other topology is that routing decisions are very simple to make, based on just a few bits. Thus the header structure may be very simple, perhaps even allowing processing of the header entirely in the optical domain. The present invention represents a significant step towards implementing an all-optical network.

Figure 7:
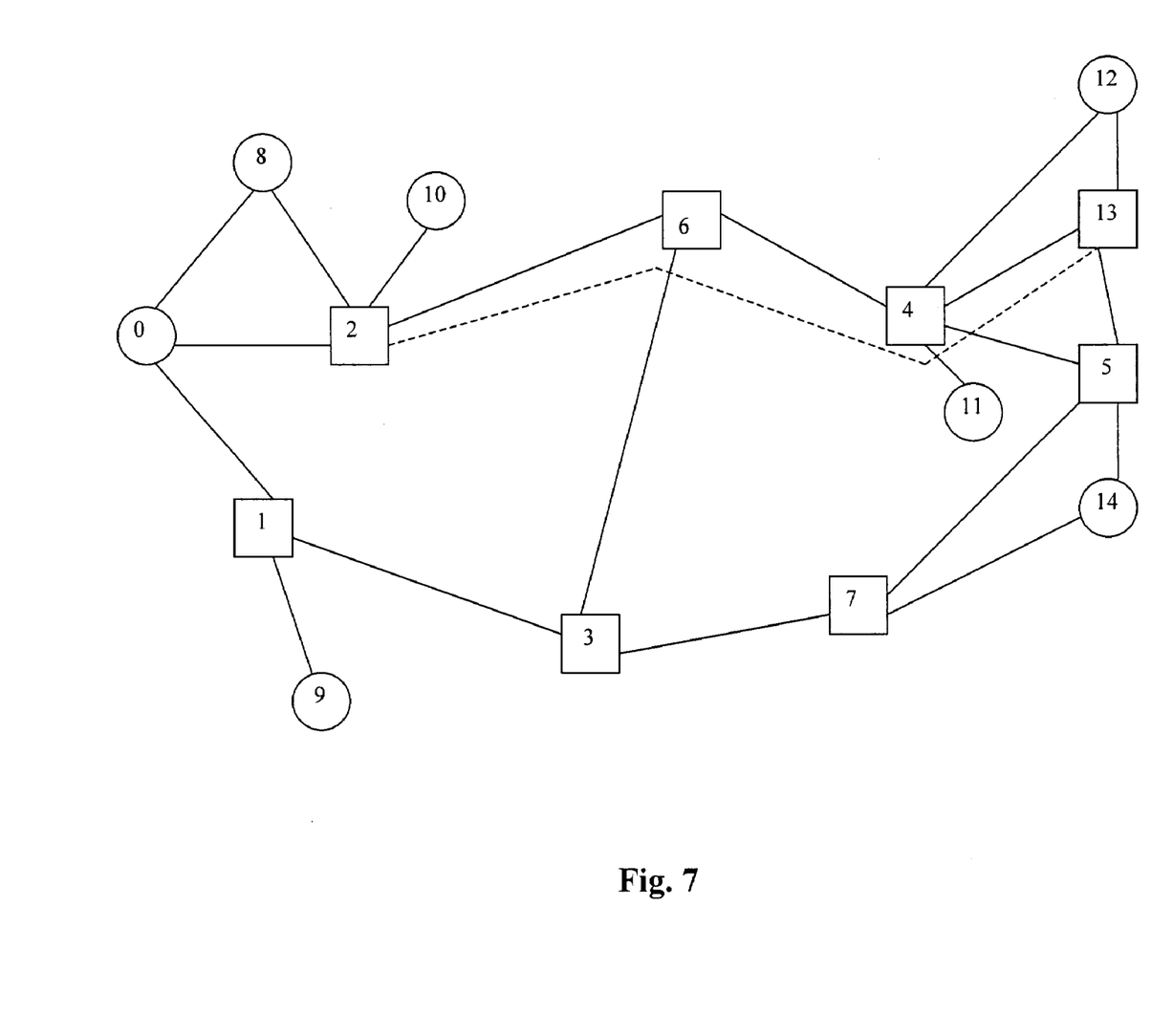
FIG. 7 depicts schematically the nodes and links of the contemporary very high speed Backbone Network Service.

For example, FIG. 7 depicts schematically the nodes and links of the contemporary very high speed Backbone Network Service. The 15 nodes of the network are shown as circles and squares, numbered 0 to 14. Initially, the difference between circles and squares may be disregarded. (Their significance is explained below.) Initially, the dashed line between nodes 2 and 13 may also be disregarded. The lines between the nodes represent the links of this network. Inspection readily shows that the network does not include even a 2-dimensional hypercube of nodes (i.e., a square), much less any higher-dimensional hypercube. Furthermore, the number of nodes in the network (15) is not a power of 2.

Figure 8:
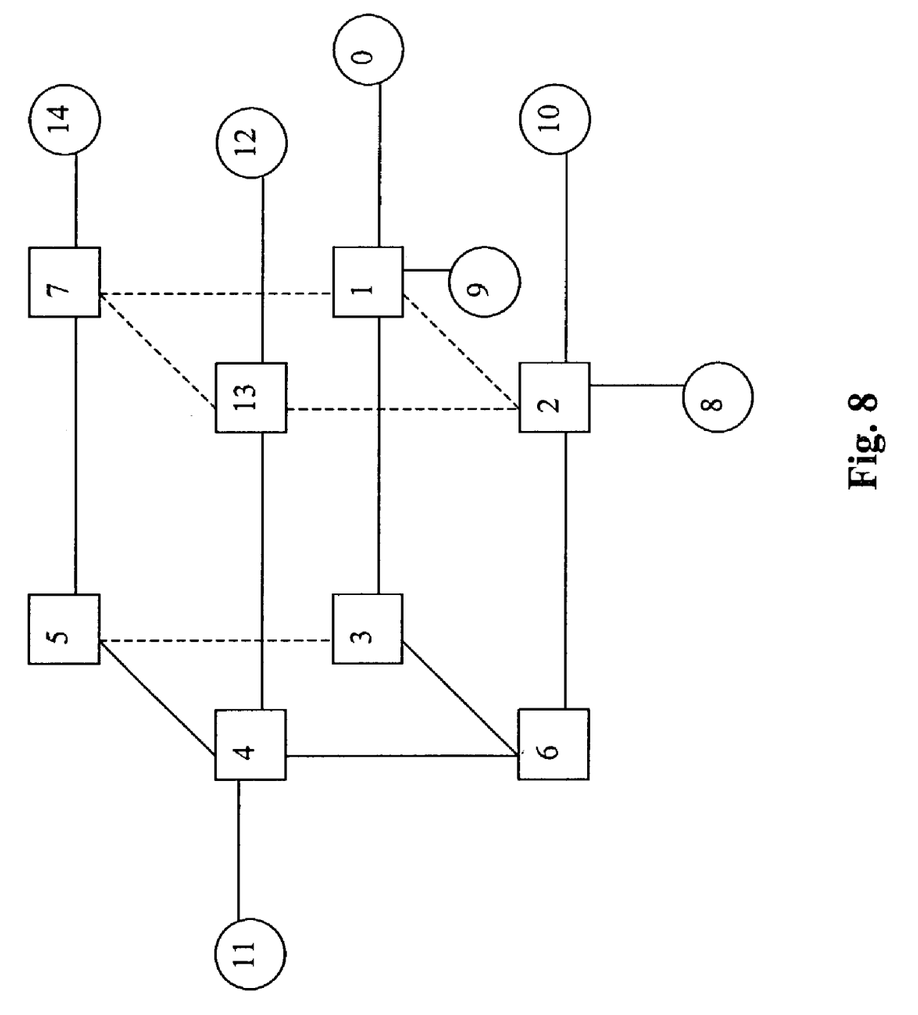
FIG. 8 depicts an "embedding" of a "virtual" 3-dimensional hypercube of 8 nodes into the network of FIG. 7.

The present invention may be implemented by "embedding" a "virtual" 3-dimensional hypercube of 8 nodes into the network of FIG. 7, as illustrated in FIG. 8. In FIG. 8, the solid lines depict actual links, while the dashed lines depict virtual links. (Note that not all physical links are shown in FIG. 8.) The square nodes are those of the embedded virtual hypercube, while the circular nodes are those that are not part of the virtual hypercube. Note in FIG. 8 that none of these remaining nodes is farther than one link from the virtual hypercube. Each of the virtual links, represented by dashed lines, is treated as one link of the hypercube. The virtual links are formed by combinations of two or more physical links connecting the pair of nodes in question, communicating along one or more dedicated wavelengths. For example, the virtual link between nodes 2 and 13 in FIG. 8 may be formed by using dedicated wavelength(s) along the path shown as a dashed line in FIG. 7: 2-6, 6-4, 4-13. The number of dedicated wavelengths for a given virtual link is the number of wavelengths needed to implement a desired communication pattern (e.g., all-to-all) in a non-blocking manner. In the virtual implementation, the number of wavelengths used by each link is determined by the specifics of the embedding. For example, if three virtual links use the same physical link, then that physical length must carry three times the number of wavelengths that would otherwise be required by a non-shared physical link. A "true" or "nonvirtual" hypercube requires $B_n$ wavelengths on each link. In a virtual hypercube implementation, the number of wavelengths required may vary from link to link, and will be a multiple of $B_n$, depending on the nature of the embedding. An established virtual path will behave as an actual link, because it is circuit-switched. For example, if three wavelengths are required for a true 3-hypercube, then in the virtual hypercube shown in FIG. 8, no physical link need be used more than two times, so no more than 2×3=6 wavelengths would be needed to communicate over any of the physical links shown in FIGS. 7 and 8.

In the original embodiments of the invention, zero or one call originates from each node, and nonblocking is guaranteed. In a variation of the invention, more than one call may optionally originate from each node—i.e., zero, one, or a plurality of calls originating from each node. Where more than one call originates from each node, nonblocking is no longer guaranteed. However, the incidence of blocking should normally still be very low (depending, of course, on the number of calls simultaneously originating from each node, and the destinations of the calls).

Routing and Wavelength Assignment. In a preferred embodiment, the invention is implemented "off-line," in the sense that both the routing and the wavelength assignments are determined off-line. The two problems (routing and wavelength assignment) are preferably solved concurrently to satisfy the stringent requirement of non-blocking, even when every node is simultaneously sending a message to all other nodes: "non-blocking, all-to-all broadcast." Subsets of this demanding communication pattern include multicasts, and any permutation among the nodes.

In a preferred embodiment for non-blocking, all-to-all communications one constructs a "special broadcast tree" (SBT). In this tree, the root is the source node. Let the source node correspond to level 0, its children correspond to level 1, etc. Let the number of required branches of the tree rooted at the source be designated as $B_n$. We will call these particular branches major subtrees (MSTs). The number $B_n$ can be greater than or equal to n, the dimension of the hypercube, indicating that some neighbors of the source might be repeated in level 1. (In other words, more than one major subtree might be rooted at a certain neighbor of the source.) $B_n$ is believed to represent the minimum number of wavelengths needed to achieve the non-blocking, all-to-all requirement using shortest paths. We assume that all the nodes in a given MST will receive signals on the same wavelength.

In a preferred construction of the special Broadcast tree (SBT), the following four conditions should be satisfied:
1. No dimension should be traversed more than once in any major subtree. (MST)
2. The number of distinct nodes covered by all major subtrees should be equal to N−1 (i.e., the major subtrees cover all the nodes except the source).
3. The number of major subtrees $B_n$ may be obtained as follows:

First, find the minimum k such that:

$$\binom{n}{k}(n-k+1) + \sum_{i=1}^{k-1}\binom{n}{i} \geq 2^n - 1$$

Then $B_n$, the number of MSTs, is given as:

$$B_n = \binom{n}{k-1} + \left\lceil \frac{(2^n-1) - \left[\binom{n}{k-1}(n-k+2) + \left(\sum_{i=1}^{k-2}\binom{n}{i}\right)\right]}{n-k+1} \right\rceil$$

Figure 4:
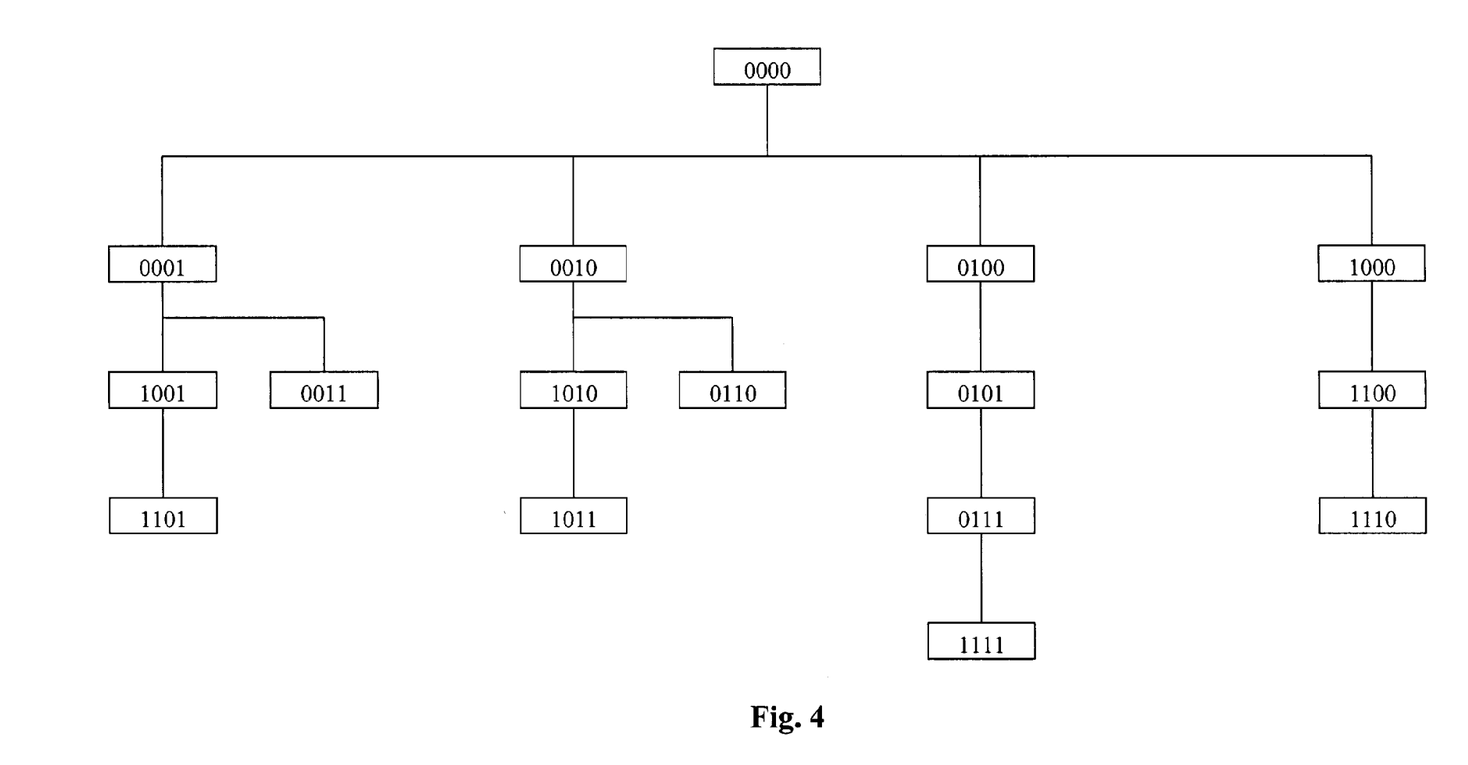
FIGS. 4, 5, and 6 depict valid SBTs for the n=4, n=5, and n=6 cases, respectively.

(This relation is demonstrated in a section below.)
4. The Jth major subtree, $MST_J$, uses a distinct wavelength $\lambda_J$ to carry the broadcast message from the source to all the nodes in $MST_J$ As an example, FIG. 4 depicts an SBT for the case n=4. In this example, $B_n$=n=4, and no dimension is repeated in any major subtree (MST). The numbers indicated at a given node in the tree correspond to the dimensions that must be traversed from the source to reach that node. The number of nodes at level i ($1 \leq i \leq n-1$) is equal to $$\binom{n}{i}.$$

Examples are given below of possible SBTs; for the cases where n=5 and n=6. Notice that an SBT is not unique for a given value of n, and that several SBTs may satisfy criteria 1 through 4 above. Notice also that if there are no repeated dimensions in any major subtree, then the maximum number of nodes covered by an MST is $\leq n$ (including the root of that MST, a node that is a neighbor of the source). Also note that an MST does not include the source node.

Next we will show that this SBT on an n-dimensional hypercube guarantees achievement of the non-blocking all-to-all broadcast condition.

Satisfying the Non-blocking Requirement. Let there be $N=2^n$ nodes interconnected in a hypercube topology. Now assume that node S, $0 \leq S \leq N-1$, is to send a message to node D, $0 \leq D \leq N-1$, $D \neq S$. We may use the following RWA procedure:
1. Construct an SBT sourced at node S. Let the number of MSTs be k. Label these MSTs as $MST_0$ through $MST_{k-2}$.
2. Find the MST that contains node D, and let its label be $MST_i$.
3. Now S can send the message using wavelength $\lambda_i$ following the paths specified in the SBT from S to D.

Note that tree construction is based on traversing the dimensions. Thus, after designing a particular SBT, the same SBT is used regardless of the identity of the source. A path is uniquely found by traversing an ordered set of dimensions.

We will now prove the non-blocking properties. By following the above RWA procedure, the message from S to D is guaranteed not to block (assuming that all links and nodes are fault-free throughout, and provided that each node is the source of zero calls or one call). Also since D may be any node in $MST_i$, it follows that a multicast from S to all the nodes in $MST_i$ will never be blocked if $\lambda_i$ is used. Further, broadcast from S to all other N-1 nodes will never be blocked provided that $MST_j$ uses $\lambda_j$ for its multicast operations (for a total of $B_n$ wavelengths). Finally, if every node uses the same RWA procedure for broadcasting as does node S, then one can have all-to-all broadcasts, using $B_n$ wavelengths, such that no calls will ever be blocked.

Notation
1. Let SBT ($N_x$) be the Special Broadcast Tree rooted at node $N_x$ and constructed in accordance with the criteria described above.
2. Let $MST_J^r(N_x)$ denote a subtree rooted at a neighbor of $N_x$ in SBT ($N_x$) along dimension J. Note that $MST_J^r(N_x)$ does not include node $N_x$ itself. The superscript r is needed only if there is more than one MST along dimension J. For example, if there are 3 subtrees along dimension J, then they would be labeled $MST_J^r(N_x)$, $0 \leq r \leq 2$.
3. Let $S_J(N_x)$ denote the set of nodes in $MST_J(N_x)$.
4. Let wavelength $\lambda_J$ be used in $MST_J^r(N_x)$. (For convenience, the superscript r is ignored in the discussion below.) Notice that when multiple MSTs exist along dimension J, a different wavelength should be used for each such MST.

Lemma 1: Without loss of generality, let SBT(0) be the special broadcast tree rooted at node 0, and let $S_J(0)$ be the set of nodes in $MST_J(0)$. An $SBT(N_\partial)$ rooted at $N_\partial \in S_J(0)$ will not have any of the nodes in $S_J(0)$ appearing in its Jth major subtree $MST_J(N_\partial)$, i.e., $S_J(0) \cap S_J(N_\partial) = \emptyset$.

Proof: All the nodes in $S_J(N_\partial)$ differ from $N_\partial 0$ in bit J. Since all the nodes in $S_J(0)$ agree in bit J, the lemma is proven.

Theorem 1 Let $N_1$ and $N_2$ be two distinct nodes. Consider any permutation that maps $N_1$ to $D_1$ and $N_2$ to $D_2$. Following the SBT construction and the RWA procedure given above, it is not possible for the $N_1$ to $D_1$ call to block the $N_2$ to $D_2$ call, or vice versa.

Proof: Since we are considering a permutation, clearly $D_1$ and $D_2$ are distinct. We prove the theorem by contradiction. Assume that the two calls $N_1$ to $D_1$ and $N_2$ to $D_2$ both attempt to use link L on wavelength $\lambda_J$ at the same time, causing a blocking. Let link L be a dimension i link, connecting node X to node $X_i$. (A "dimension i link is a link that connects two nodes whose labels differ in bit i.) Because both calls use $\lambda_J$, they both follow their respective Jth MSTs, namely $MST_J(N_1)$ and $MST_J(N_2)$. Nodes X and $X_i$ must be in both subtrees, in the same positions by virtue of the tree construction. Also, the link in question corresponds to two adjacent nodes in the Jth subtree. To reach this link from $N_1$ and $N_2$, one must traverse exactly the same set of dimensions in the same order. This implies that $N_1 \oplus X = N_2 \oplus X$, or $N_1 = N_2$ (where $\oplus$ represents the bit-wise EXCLUSIVE OR operation). Since $N_1$ and $N_2$ were assumed to be distinct we have a contradiction, thus proving the theorem.

Theorem 2 Following the above SBT construction and RWA procedure, any permutation P can be executed without any blocking.

Proof: This conclusion follows directly from the proof for Theorem 1, since $D_1$ and $D_2$ were arbitrary and distinct.

Lemma 2 A multicast operation from any source $N_1$ to all the nodes in the J th MST, $MST_J(N_1)$, using $\lambda_J$ is a non-blocking operation.

Proof: Assume that there is no other traffic in the network. There can be no conflict by virtue of the tree construction, and all nodes in $MST_J(N_1)$ will receive the call on A Theorem 3 A broadcast operation from node $N_1$ to all other nodes in the system following the above RWA procedure is a non-blocking operation.

Proof: Assume no other traffic. The broadcast in this case is a union of multicast operations on different MSTs using different wavelengths. The nodes in $S_J(N_1)$, $1 \leq J \leq k$, are disjoint from the nodes in $S_M(N_1)$, $1 \leq J \neq M \leq k$. By Lemma 2, these are all independent multicast operations, and will therefore be blocking-free, thus proving the theorem.

Lemma 3 Consider a broadcast operation from $N_1$ to all other nodes in the system following $SBT(N_1)$, and a multicast operation from $N_2 \neq N_1$ using $MST_J(N_2)$. The two operations will not result in any blocking.

Proof: If a collision can occur then it must be on paths specified by the $MST_J(N_1)$ and $MST_J(N_2)$ paths. Both subtrees use wavelength J (where J is arbitrary). There are two cases:

Case 1

$N_2 \in S_J(N_1)$

In this case $N_2$ will be in $MST_J(N_1)$ (and $N_1$ will be in $MST_J(N_2)$). However, none of the other nodes in $S_J(N_1)$ (other than $N_2$) will be in $MST_J(N_2)$ by Lemma 1. Thus, if a collision is to occur, it must involve the call on wavelength J to $N_2$. However, this call will traverse edges from $N_1$ to $N_2$ following $MST_j(N_1)$ that are of opposite direction from those in the $N_2$ to $N_1$ paths in the MST ($N_2$). This will not result in blocking.

Case 2

$N_2 \notin S_j(N_1)$

In this case $MST_j(N_2)$ does not include $N_1$ and $MST_j(N_1)$ does not include $N_2$ (i.e., $N_2 \notin S_j(N_1)$ and $N_1 \notin S_j(N_2)$). The proof by contradiction is similar to that for Theorem 1, but is stated here for completeness. Assume that there is a collision on the dimension r link $N_3 \to N_4$ where $N_3 \in S_j(N_2)$ and $N_3 \in S_j(N_1)$ Because no dimension is repeated in any MST by virtue of the tree construction, this can only occur if $N_1 = N_2$. Since $N_1$ and $N_2$ were assumed to be distinct we have a contradiction, thus proving the lemma.

Thus the two operations are non-blocking with respect to one another.

Theorem 4 Any two broadcast operations from $N_1$ and $N_2$, $N_1 \neq N_2$, are mutually non-blocking.

Proof: The proof follows directly from Lemma 3 since the broadcast from $N_2$ is the union of disjoint multicasts using different wavelengths, and since j was selected arbitrarily.

Theorem 5 All-to-all broadcast operations are non-blocking under the reported SBT construction and RWA procedure.

Proof: This conclusion follows directly from Theorem 4, since $N_1$ and $N_2$ are arbitrary nodes.

Because the SBT is not unique, one may construct several SBTs, and then select the tree that offers the fewest splits, or that maximizes the power delivered to all nodes. However, once a particular SBT is selected, it should then be used by all the nodes; i.e., the structure of each SBT relative to its own source node should be the same for all SBTs.

In many cases, the network may be viewed as containing two entities: a "transport network" (or "transport plane") and a "control plane." The "control plane" is used for exchanging status and control information among the nodes to aid in selecting paths and wavelengths for routing on the transport network. The present invention is well-suited to implement the control plane. It allows for extremely efficient information exchange operations (all-to-all broadcasts) using a small number of wavelengths for a given connectivity. For example, the wavelengths used for the control plane could simply be reserved wavelengths on the transport network. In this example, the two planes would share the same nodes and links, but operate on different wavelengths. Another alternative would be to implement the control plane separately.

Non-Blocking Permutation Routing. We will now use the above results to demonstrate a simple RWA solution that guarantees non-blocking in the less demanding case of permutation. By definition, a "permutation" is a one-to-one and onto mapping from a set of nodes $S_N$ to itself. Thus, in a "permutation routing," each node originates exactly one call, and each node receives exactly one call.

We present a simple RWA for non-blocking permutation routing, assuming a hypercube connectivity. The following theorem establishes a lower bound. The proof will introduce a particular RWA.

Theorem 6 In an n-dimensional binary hypercube topology, any arbitrary permutation can be routed in a conflict-free manner using $B_{n-1}$ wavelengths; where $B_{n-1}$ is the bound on the number of wavelengths for all-to-all, conflict-free routing in an (n−1)-dimensional hypercube network.

Proof:

We prove the theorem by presenting an RWA algorithm that only requires $B_{n-1}$ wavelengths, and is conflict-free. Without loss of generality partition the n-dimensional hypercube into two n−1 sub-hypercubes, using the most significant bit as the basis for the partition. From any source S to any destination D, first ignore the most significant bit and route the packet to the node in the same subcube that agrees with D in bits 0 through n−2 (say, D*), using the wavelength specified by the $SBT_{n-1}(S)$. Notice that D* may or may not be same as D.

Now consider the most significant bit. If D=D*, then the proof is complete. If D≠D*, then continue on the same wavelength from D to D*. In the first case the routing is conflict-free by Theorem 1. In the second case D and D* are in different sub-hypercubes, and are connected by a link along dimension n−1. Notice that according to the RWA, D can only be reached from the other subcube via D*. Since we are considering a permutation, exactly one call will be destined to D. If that one call is from the other sub-hypercube, it will come via D*, and cannot be blocked since only one call is on the D* to D link. Otherwise, D is reached from its own sub-hypercube using the RWA above, which we have shown above is conflict-free. Notice that the partitioning could have been conducted using any other bit, in lieu of the most significant bit.

All-to-all Broadcast on Augmented Hypercubes. The bound on the number of wavelengths for all-to-all conflict free broadcasts derived above may result in a larger number of wavelengths than one might be willing to use in a particular application. If so, a compromise may be used that allows a reduction in the total number of wavelengths employed, but that requires additional links as a tradeoff to achieve a non-blocking, all-to-all broadcast. Under such circumstances, one may repeat one or more dimensions in a given MST; but each repeated dimension should then correspond to a new set of links. So if, in a given MST, a dimension appears r times, then r−1 additional link sets should be added. Notice that the same wavelengths assigned to that MST may be used on the newly added links. With the addition of a duplicate link set along a given dimension, one may construct a tree following an approach similar to that presented above. Let there be 2 link sets along dimension d. We can label the sets $d^0$ and $d^1$. We construct the SBT so that $d^x$ appears at most once in any MST ($x \in \{0, 1\}$).

Derivation of a Bound on the Number of Wavelengths. In this section we establish a bound on the minimum number of wavelengths needed to achieve all-to-all, non-blocking routing assuming a hypercube-connected network. This derivation is based on the following assumptions:

(1) No dimension is repeated in any major subtree (MST).
(2) The collection of major subtrees covers all nodes except the source (i.e., a total of N−1 nodes).
(3) Each major subtree MST uses a distinct wavelength to deliver the packet to all nodes in that MST.

Next we determine the number of MSTs needed.

Determining the Bound $B_n$

Preliminaries:

1. Each MST covers at most n nodes, since no dimension is repeated in any MST. Thus if $N-1 > n \log_2 N$, we must have more than n major subtrees. In this case some nodes will be repeated, and new nodes will appear in MSTs labeled $J > \log_2 N$. In this case the number of nodes covered is $\leq n = n_r + n_n$; where $n_r$ is the number of repeated nodes (that appeared in some other MST) and $n_n$ is the number of new nodes.

2. We assume that the tree is constructed using this approach with a minimum number of MSTs.

3. In an n-dimensional hypercube, the source of a broadcast will have $$\binom{n}{1} = n$$

nodes at distance 1, $$\binom{n}{2}$$

nodes at distance 2, $$\binom{n}{k}$$

nodes at distance k and $$\binom{n}{n} = 1 \text{ node at distance } n.$$

1 node at distance n.

Developing the Bound

Case (a)

For the case where $n^2 > 2^n - 1$ the lower bound on the number of wavelengths for an all-to-all, no-blocking broadcast is n. (This is true for the cases of n=2, 3, and 4.)

Case (b)

Figure 5:
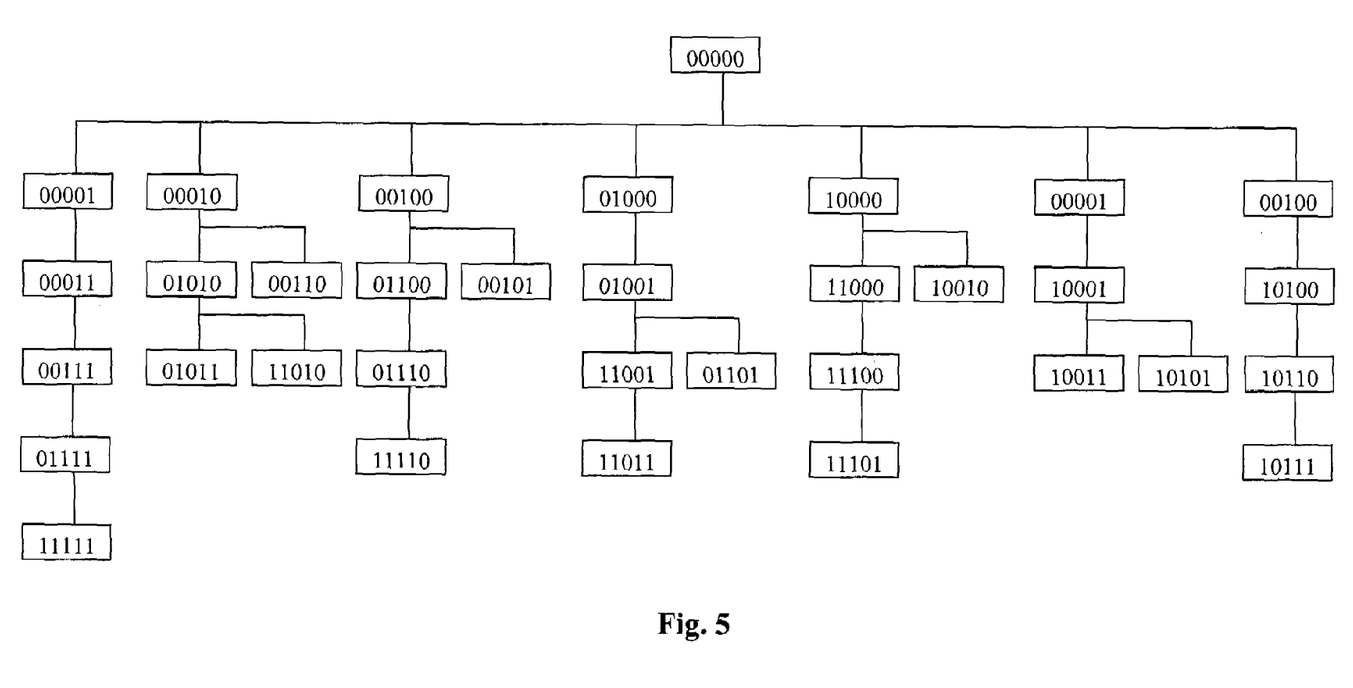
Figure 6:
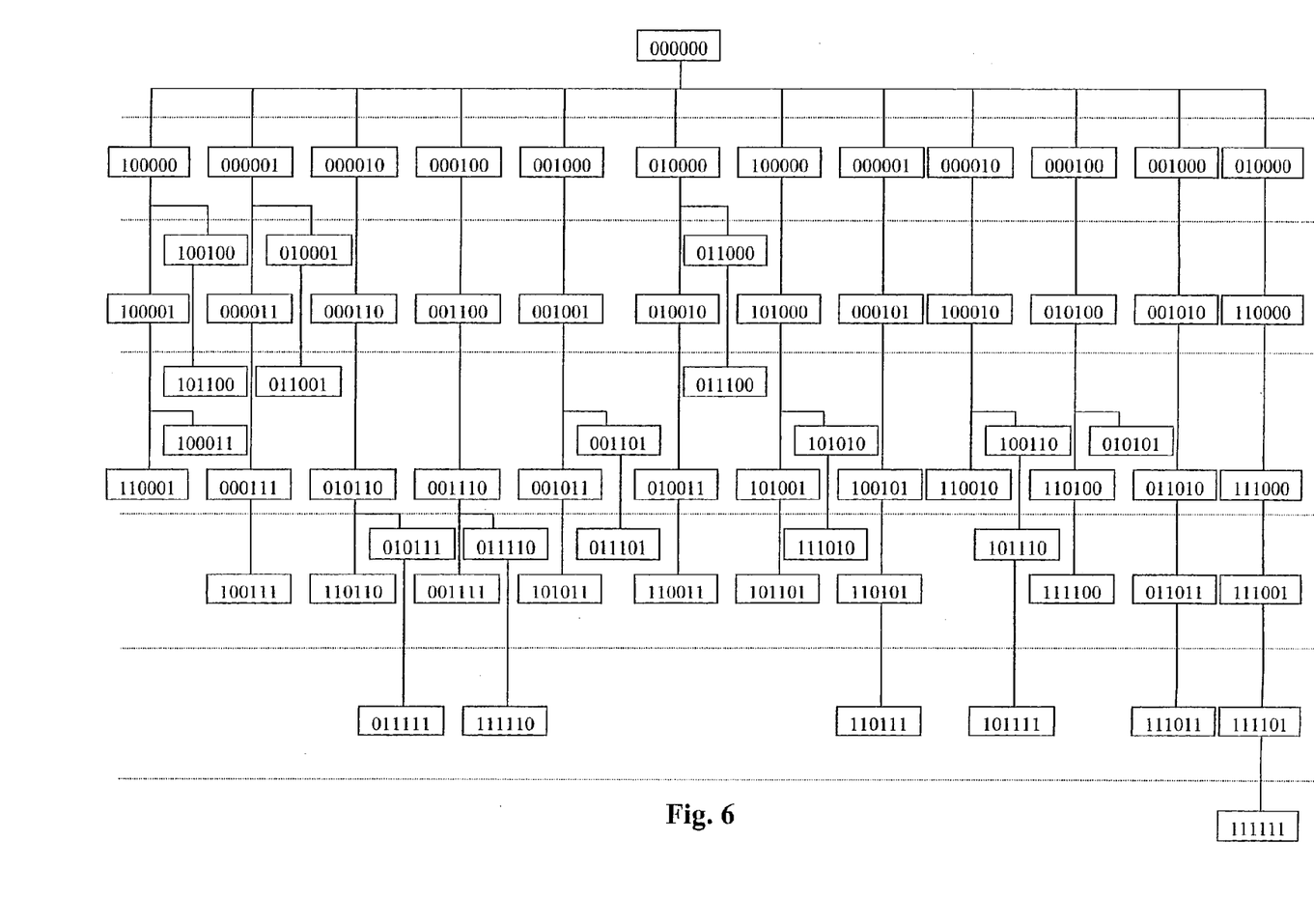

For the case where $n^2 < 2^n - 1$ we may follow a certain procedure to determine the minimum number of wavelengths. To illustrate this procedure, let us first consider the smallest network for which nodes will have to be repeated, which is the case of 5 dimensions (n=5 or N=32). In this case the first five MSTs will cover 5×5=25 distinct nodes, a number less than $2^5 - 1 = 31$. We therefore repeat some nodes at level 1. To determine the number of repeated nodes at level 1, we may use the following reasoning: Let the number of additional MSTs (greater than 5) be a. Each of these additional MSTs can only cover 4 new and distinct nodes. Since we need to cover 31−25=6 new nodes with these new MSTs, we need $$\left\lceil \frac{6}{4} \right\rceil$$

new branches. Thus for n=5, we need only 7 wavelengths to cover the 31 nodes (i.e., $B_n$=7). FIGS. 5 and 6 depict valid SBTs for the n=5 and n=6 cases, respectively.

Cases where n>5 may be more complicated because, not only does one repeat nodes at level 1, but nodes at higher levels may also be repeated.

Suppose that level k−1 is the last (highest-numbered) level with repeated nodes. The MSTs containing repeated level k−1 nodes can only cover n−(k−1) new (uncovered) nodes. Let $X_k$ be the total number of distinct nodes covered by $$\binom{n}{k}$$

branches (MSTs). $X_k$ may be calculated as:

$$X_k = \binom{n}{k}(n - k + 1) + \sum_{i=1}^{k-1}\binom{n}{i}.$$

This equation may be derived as follows: The case where the maximum number of nodes is repeated at level 1 but no nodes are repeated at level 2 corresponds to $$\binom{n}{2}$$

MSTs. In this case the total number of distinct nodes covered is $$\left[\binom{n}{2} - n\right](n-1) + n^2 = \binom{n}{2}(n-1) + \binom{n}{1}.$$

Similarly, the case where no node is repeated at level 3, while covering the maximum number of distinct nodes is when $$\binom{n}{3}$$

MSTs are used. In this case the total number of nodes covered is $$\left[\binom{n}{3} - \binom{n}{2}\right](n-2) + \binom{n}{2}(n-1) + \binom{n}{1} = \binom{n}{3}(n-2) + \binom{n}{2} + \binom{n}{1}$$

With $$\binom{n}{k}$$

branches and no repeated nodes at level k, we can cover a maximum of $$X_k = \binom{n}{k}(n-k+1) + \binom{n}{k-1} + \binom{n}{k-2} + \ldots + \binom{n}{2} + \binom{n}{1}, \text{ or}$$

$$X_k = \binom{n}{k}(n-k+1) + \sum_{i=1}^{k-1} \binom{n}{i}$$

Therefore, the number of wavelengths (MSTs) can be determined from the following relation:

$$X_{k-1} \leq 2^n - 1 \leq X_k^1$$

where $X_k$ is as given previously. So, we first find k, such that the above equation is satisfied. Notice that $k_1$ is the first level (highest numbered) where no nodes are repeated.

From there we find $B_n$, the minimum number of wavelengths (MSTs) for conflict-free, all-to-all broadcast, as follows:

$$B_n = \binom{n}{k_1 - 1} + \left\lceil \frac{(2^n - 1) - X_{k_1 - 1}}{n - k_1 + 1} \right\rceil$$

Miscellaneous. The complete disclosures of all references cited in the specification are hereby incorporated by reference. In the event of an otherwise irreconcilable conflict, however, the present specification shall control.

Unless otherwise clearly indicated by context, as used in the specification and claims the term "subset" should be understood to have its conventional meaning from set theory, i.e., to include both proper and improper subsets. Set A is said to be a subset of set B if and only if every member of A is also a member of B. A "proper subset" of a set is a subset that is not the entire set, while an "improper subset" of a set contains every member of the original set. E.g., A is an improper subset of A. Thus, unless otherwise clearly indicated by context, a "subset" that is not stated to be a "proper subset" may either be the same as the original set, or it may be a "proper subset."

We claim:

1. A method for routing calls in an optical network comprising an n-dimensional, virtual or nonvirtual, binary hypercube of $2^n$ nodes, wherein n is an integer 2 or greater; wherein one or zero calls originate from each node; wherein calls originating from different nodes may be the same or different; wherein each node may be identified by a unique n-bit binary label; wherein each node is connected to n other nodes; wherein the labels of any two directly connected nodes differ in one, and only one bit; said method comprising routing calls over paths between the nodes in accordance with a special broadcast tree associated with each node; wherein the special broadcast tree for each node has the same structure relative to its source node, wherein the source node is the node with which the special broadcast tree is associated; and wherein the special broadcast tree for any given source node, satisfies each of the following criteria:
   (a) the special broadcast tree comprises a plurality B of major subtrees, wherein each major subtree is associated with one node that is directly connected to the source node; and wherein each major subtree defines a set of paths for delivering a call to a proper subset of the nodes in the hypercube; and wherein no more than one directly connected pair of nodes within the same major subtree differs at the same bit position of their respective labels;
   (b) each node other than the source node, is contained in at least one major subtree;
   (c) the number of major subtrees B is greater than or equal to $B_n$, wherein $$B_n = \binom{n}{k-1} + \left\lceil \frac{(2^n - 1) - \left[\binom{n}{k-1}(n-k+2) + \left(\sum_{i=1}^{k-2} \binom{n}{i}\right)\right]}{n - k + 1} \right\rceil$$

wherein k is the smallest integer such that $$\binom{n}{k}(n-k+1) + \sum_{i=1}^{k-1} \binom{n}{i} \geq 2^n - 1$$

and
   (d) each of the B major subtrees uses a different wavelength to carry calls from the source node to all nodes contained in the major subtree; and wherein all paths within a given major subtree use the same wavelength; and wherein all nodes within the special broadcast tree receive the same call from the source node;
   whereby:
   none of the calls in the network blocks any other call in the network.

2. A method as recited in claim 1, wherein one call originates from each node at a particular time; and wherein said method routes calls from each node in the network to all other nodes in the network.

3. A method as recited in claim 1, wherein one call originates from one source node at a particular time; and wherein all nodes other than the source node originate zero calls at the same time; and wherein said method routes calls from the source node to all other nodes in the network.

4. A method as recited in claim 1, wherein one call originates from one source node at a particular time; and wherein all nodes other than the source node originate zero calls at the same time; and wherein said method routes calls from the source node to a subset of all other nodes in the network.

5. A method as recited in claim 1, wherein one call originates from each node in a first proper subset of nodes in the network at a particular time; and wherein said method routes calls from each node in the first subset to all nodes in a second proper subset of nodes in the network; wherein the first and second subsets may be the same or different.

6. A method as recited in claim 1, wherein one call originates from each node at a particular time; and wherein each node receives exactly one call.

7. A method as recited in claim 1, wherein one call originates from each node in a first subset of nodes in the network at a particular time; and wherein said method routes calls from the nodes in the first subset to the nodes in a second subset of nodes in the network; wherein the first and second subsets may be the same or different; and wherein each node in the second subset receives exactly one call.

8. A method as recited in claim 1, wherein the network comprises a control plane that communicates status information concerning a data plane among the nodes in the control plane; wherein the data plane comprises a second network of nodes; wherein the second network and the n-dimensional binary hypercube may be the same or different.

9. A method as recited in claim 1, wherein the recited network is a proper subset of a larger optical network comprising more than $2^n$ nodes; wherein the larger optical network is not a binary hypercube.

10. A method as recited in claim 9, wherein the hypercube is a virtual hypercube, wherein at least some of the nodes in the recited network are connected to one another by one or more virtual links; wherein a virtual link comprises a path of a plurality of directly connected nodes that transmit calls over one or more reserved wavelengths.

11. A method as recited in claim 1, wherein the hypercube is a nonvirtual hypercube, wherein each pair of nodes whose labels differ in one, and only one bit is directly connected to one another.

12. A method for routing calls in an optical network comprising an n-dimensional binary hypercube of $2^n$ nodes, wherein n is an integer 2 or greater; wherein one call originates from each node in a first subset of nodes in the network at a particular time; wherein calls originating from different nodes may be the same or different; wherein each node may be identified by a unique n-bit binary label; wherein each node is connected to n other nodes; wherein the labels of any two connected nodes differ in one, and only one bit; said method comprising routing calls over paths between the nodes in accordance with a special broadcast tree associated with each node; wherein the special broadcast tree for each node has the same structure relative to its source node, wherein the source node is the node with which the special broadcast tree is associated; and wherein the special broadcast tree for any given source node, satisfies each of the following criteria:

(a) the special broadcast tree comprises a plurality B of major subtrees, wherein each major subtree is associated with one node that is directly connected to the source node; and wherein each major subtree defines a set of paths for delivering a call to at most one of the nodes in the hypercube, wherein this delivered subset and the first subset may be the same or different; and wherein no more than one directly connected pair of nodes within the same major subtree differs at the same bit position of their respective labels;

(b) each node other than the source node, is contained in at least one major subtree;

(c) the number of major subtrees B is greater than or equal to $B_{n-1}$, wherein $$B_{n-1} = \binom{n-1}{k-1} + \left\lceil \frac{(2^{(n-1)}-1) - \left[\binom{n-1}{k-1}(n-k+1) + \left(\sum_{i=1}^{k-2}\binom{n-1}{i}\right)\right]}{n-k} \right\rceil$$

wherein k is the smallest integer such that $$\binom{n-1}{k}(n-k) + \sum_{i=1}^{k-1}\binom{n-1}{i} \geq 2^{(n-1)} - 1$$

and (d) each of the B major subtrees uses a different wavelength to carry a call from the source node to at most one of the nodes contained in the major subtree; and wherein all paths within a given major subtree use the same wavelength; and wherein all nodes within the special broadcast tree receive the same call from the source node;

wherein:

(e) said method routes calls from the nodes in the first subset to the nodes in a second subset of nodes in the network; wherein the first and second subsets may be the same or different; and wherein each node in the second subset receives exactly one call;

whereby:

none of the calls in the network blocks any other call in the network.

13. A method for routing calls in an optical network comprising an n-dimensional binary hypercube of $2^n$ nodes, wherein n is an integer 2 or greater; wherein zero, one, or a plurality of calls originate from each node; wherein calls originating from different nodes may be the same or different; wherein each node may be identified by a unique n-bit binary label; wherein each node is connected to n other nodes; wherein the labels of any two connected nodes differ in one, and only one bit; said method comprising routing calls over paths between the nodes in accordance with a special broadcast tree associated with each node; wherein the special broadcast tree for each node has the same structure relative to its source node, wherein the source node is the node with which the special broadcast tree is associated; and wherein the special broadcast tree for any given source node, satisfies each of the following criteria:

(a) the special broadcast tree comprises a plurality B of major subtrees, wherein each major subtree is associated with one node that is directly connected to the source node; and wherein each major subtree defines a set of paths for delivering a call to a proper subset of the nodes in the hypercube; and wherein no more than one directly connected pair of nodes within the same major subtree differs at the same bit position of their respective labels;

(b) each node other than the source node, is contained in at least one major subtree;

(c) the number of major subtrees B is greater than or equal to $B_n$, wherein $$B_n = \binom{n}{k-1} + \left\lceil \frac{(2^n - 1) - \left[\binom{n}{k-1}(n-k+2) + \left(\sum_{i=1}^{k-2}\binom{n}{i}\right)\right]}{n-k+1} \right\rceil$$

wherein k is the smallest integer such that $$\binom{n}{k}(n-k+1) + \sum_{i=1}^{k-1}\binom{n}{i} \geq 2^n - 1$$

and (d) each of the B major subtrees uses a different wavelength to carry calls from the source node to all nodes contained in the major subtree; and wherein all paths within a given major subtree use the same wavelength; and wherein all nodes within the special broadcast tree receive the same call from the source node.

* * * * *